June 20, 1950 O. K. KOLB ET AL 2,512,432

PROCESS OF AND APPARATUS FOR LOCATING SOUND SIGNALS
ON MAGNETIC TYPE SOUND RECORD CARRIERS
Filed July 18, 1947

Inventors:-
Otto Kurt Kolb,
Axel Carl Georg Petersen,
by
Pierce, Scheffler & Parker,
Attorneys.

Patented June 20, 1950 2,512,432

UNITED STATES PATENT OFFICE 2,512,432

PROCESS OF AND APPARATUS FOR LOCATING SOUND SIGNALS ON MAGNETIC TYPE SOUND RECORD CARRIERS

Otto Kurt Kolb and Axel Carl Georg Petersen, London, England, assignors to British Acoustic Films Limited, London, England, a British company Application July 18, 1947, Serial No. 761,980
In Great Britain October 30, 1946

6 Claims. (Cl. 88—16.2)

Figure 1:
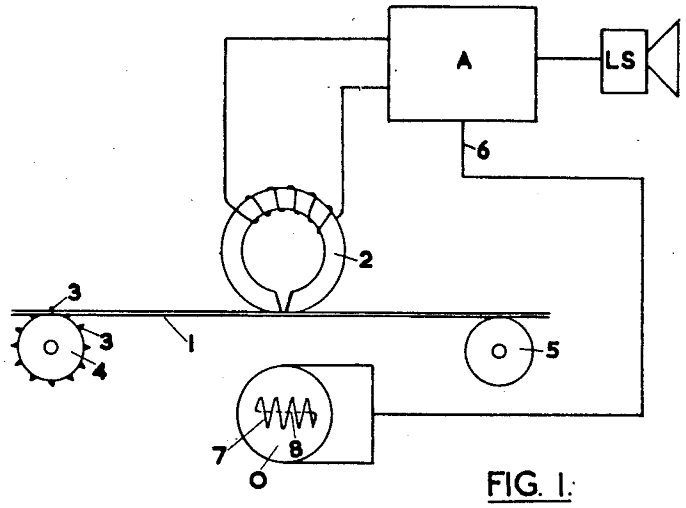

This invention relates to an improved method of and apparatus for locating sound signals on sound record carriers in order to facilitate the handling of them and has for its principal object to provide an arrangement which will enable sound records made without a visible indication to be readily edited and cut either for film phonograph purposes or for sound film purposes.

Carriers upon which a sound record or signal can be made without a visible indication are already known as, for example, those employing a carrier whereon the sound record itself is opaque to ultra-violet rays but is translucent to visible light. A further method of making a very high quality invisibly recorded sound record with a high degree of contrast and wide frequency range is that which is obtained by magnetic means employing a carrier made of paper or other plastic materials which are impregnated or coated with a ferro-magnetic or similar compound.

It is already known to use this type of recording in film phonographs and it can also be used for sound film recording.

For this latter process, the picture record and sound record have to be reproduced simultaneously in a cutting and editing machine by winding them through the machine, beginning at corresponding synchronizing marks, and viewing both a projected image from the picture record and hearing and also seeing the sound record at the same time (when the latter is visible, as on a sound film), in order to locate the sound passages for editing and cutting the sound record for use in conjunction with the corresponding picture record. For film phonographs and so-called "spoken" books it is, of course, only necessary to be able to locate the sound passages in order to edit the recorded sequences.

However, it is very difficult when the sound record is invisible, as on a magnetic tape, to edit and cut it accurately as the sound passages cannot be located and this increases the difficulties of using such invisibly recorded sound records in conjunction with a complementary picture record since the sound record has to be cut very accurately, almost to within the length of an inch, to synchronize it properly with the corresponding picture record.

Accordingly, this invention provides a method of overcoming these difficulties by locating the invisible sound signals on sound record carriers by showing the sound signals on an indicating device in circuit with a reproducing head.

This is done, according to the invention, by playing back an invisibly recorded sound record in known manner and taking a portion of the signals reproduced from the sound record and applying it to a device, such as an oscilloscope, which will show as soon as a sound signal is passing the reproducing point. This will permit the beginning and end of sound signals recorded on the carrier to be readily located and thus enable the sound record to be edited and, if desired, to be cut and synchronized with a complementary picture record. The portion of the sound signal currents applied to the indicating device may be rectified in known manner to provide a shift current which merely follows the envelope or average value of the sound waves being reproduced. Alternatively, any other control current derived from the reproduced sound signals may be employed.

It is preferred to use a cathode ray tube, known as an oscilloscope, as the indicating device although the invention is not limited to this precise type of device since a swinging mirror oscillograph, light valve, glow lamp, volume indication meter or the like could be employed.

Figure 2:
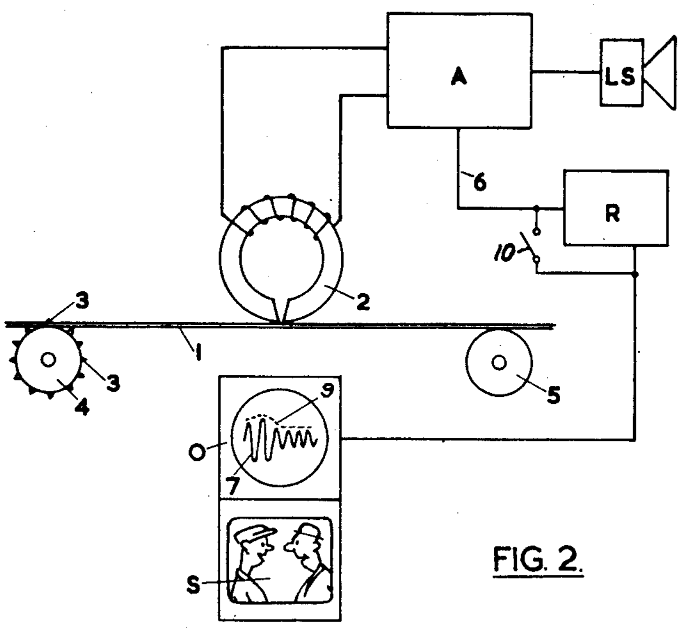

The invention will now be described with reference to the accompanying drawings, given by way of example, wherein:

Fig. 1 is a schematic diagram, illustrating one embodiment of the invention; and Fig. 2 is a modification of the arrangement shown in Fig. 1.

Referring first to Fig. 1 of the accompanying drawings, the reference numeral 1 identifies the carrier upon which the sound signal is invisibly recorded and, in this figure, the carrier comprises a tape made of paper or plastic material and containing or coated with a ferro-magnetic material.

The sound signals recorded on the tape 1 are reproduced in known manner by means of the magnetic reproducing head 2, the signals from which are fed to an amplifier A and reproduced in the loudspeaker LS, also in known manner. The loudspeaker LS may be replaced by headphones (not shown) or these may be used in addition, if so desired. Alternatively, both the loudspeaker and headphones may be entirely dispensed with and the operator may rely solely upon the visible signal indicating device.

The tape 1 may be provided with perforation holes which are necessary for synchronizing purposes, as with a complementary picture record, for example. In the latter case these holes are engaged by the teeth 3 in the sprocket 4. The sprocket 4 is driven by a motor (not shown) and draws the tape 1 over an idle roller 5 past the reproducing head 2. The sprocket 4 may be replaced by a driven drum, if desired.

A portion of the signals being reproduced is branched off from the amplifier A by a line 6 and applied to a cathode ray oscilloscope O. The arrangement is such that the portion of the signals directed to line 6 modulates the beam in the oscilloscope O when any signal passes the reproducing head 2 and shows a modulated waveform generally indicated at 7; whereas, when no signal is passing, the cathode ray beam is substantially unmodulated and shows a straight line illustrated by way of example as a dotted line 8.

Fig. 2 shows a modified arrangement of the embodiment illustrated in Fig. 1, the tape 1 is shown by way of example as being engaged by the teeth 3 on the sprocket and drawn past the reproducing head 2 and over the idle roller 5 as in Fig. 1 and sound signals are similarly reproduced by the head 2 and amplified by the amplifier A and reproduced by the loudspeaker LS also in the same manner. However, the line 6 to the oscilloscope O includes a rectifying device R which rectifies the audio frequency signal current which is diverted to the line 6 and applies a rectified or shift current component to the oscilloscope O. This rectified or shift current follows the envelope or average value of the sound waves passing the reproducing point 2 so that periods of sound on the tape 1 will be shown by corresponding displacement from the straight line of the beam in the oscilloscope O; this being indicated by the dotted line 9. The device R may operate in any other suitable manner and may apply a control current, derived from the reproduced sound signals, to the oscilloscope O. Should the device R be dispensed with by closing the shunt switch 10, the beam would be modulated in greater detail as shown by solid line curve 7.

A further object of the arrangement shown in Fig. 2 is to provide a simple and convenient method by which the operator is able not only to locate the sound signals on the carrier 1 but also to view the corresponding, but not illustrated, picture record. This is reproduced in known manner on a screen S which is fixed to, or combined in close proximity with, the oscilloscope O.

The sound record 1 and the picture record are reproduced simultaneously and the operator can then locate the sound signals, and more particularly the gaps between sound signals, on the tape 1 from the indication given by the device O thus facilitating the handling, editing and cutting of the sound and picture records. The particular sounds, which may be words or music, are of course identified orally from the sound reproduction, and the inter-sound spaces at which the record strip is to be cut are identified from the visual indication on the oscilloscope or equivalent device.

We claim:

1. In the production of synchronized sound and picture records from sound signals invisibly recorded on a magnetic type sound carrier and a complementary picture sequence recorded on another carrier, the process of editing the sound carrier which comprises reproducing the picture sequence on a screen, simultaneously reproducing the recorded sound signals at their original frequencies, simultaneously therewith developing in the field of vision including said picture sequence screen a visual indication which varies with the sound signals invisibly recorded on said magnetic type sound carrier, and cutting the sound carrier at spaces between recorded sounds as identified from said visual indications.

2. In the production of synchronized sound and picture records, the invention as recited in claim 1, wherein the reproducing of the recorded sound signals includes the production of an electrical voltage which fluctuates according to the recorded sound signals, and said voltage is employed in the development of the visual indication which varies with the sound signals.

3. In the production of synchronized sound and picture records, the invention as recited in claim 2, wherein the development of said visual indication includes the step of developing from said electrical voltage a rectified voltage which fluctuates as a function of said electrical voltage.

4. In apparatus for editing record carriers to synchronize a picture sequence recorded on a carrier and sound invisibly recorded on a magnetic type sound carrier; means for reproducing the picture sequence on a screen, a sound reproducing head and means for displacing a magnetic type sound carrier with respect thereto to develop an electrical current of the sound frequencies invisibly recorded on the sound carrier, a sound reproducer energized by said current to reproduce the recorded sound at its original frequency, and indicating means energized by said current for developing in the field of vision which includes said screen a visual indication which varies as a function of the recorded sound signals.

5. In apparatus for editing record carriers, the invention as recited in claim 4, wherein said indicating means includes an oscilloscope adjacent said screen, and means for developing on said oscilloscope a curve varying at the frequency of the recorded sound signals.

6. In apparatus for editing record carriers, the invention as recited in claim 4, wherein said indicating means includes an oscilloscope adjacent said screen, and means for developing on said oscilloscope a curve varying as a function of the frequency of the recorded sound signals.

OTTO KURT KOLB.
AXEL CARL GEORG PETERSEN.

REFERENCES CITED

The following references are of record in the file of this patent:

UNITED STATES PATENTS

| Number | Name | Date |
|---|---|---|
| 2,029,730 | Mallina | Feb. 4, 1936 |
| 2,260,702 | Collins | Oct. 28, 1941 |
| 2,284,150 | Kemna | May 26, 1942 |
| 2,336,777 | Clausen | Dec. 14, 1943 |
| 2,348,050 | Barnstyn | May 2, 1944 |
| 2,416,353 | Shipman | Feb. 25, 1947 |
| 2,424,218 | Begun | July 22, 1947 |

FOREIGN PATENTS

| Number | Country | Date |
|---|---|---|
| 715,411 | France | Sept. 28, 1931 |
| 639,016 | Germany | Nov. 26, 1936 |